United States Patent [19]

Christie

[11] Patent Number: 5,918,056
[45] Date of Patent: Jun. 29, 1999

[54] SEGMENTATION SUSPEND MODE FOR REAL-TIME INTERRUPT SUPPORT

[75] Inventor: David S. Christie, Austin, Tex.

[73] Assignee: Advanced Micro Devices, Inc., Sunnyvale, Calif.

[21] Appl. No.: 08/649,246

[22] Filed: May 17, 1996

[51] Int. Cl.⁶ ..................................................... G06F 13/00
[52] U.S. Cl. .......................... 395/733; 395/739; 395/740; 395/741; 395/742; 711/207; 711/208
[58] Field of Search ..................................... 395/733, 734, 395/568, 739, 740, 741, 742; 364/200; 711/207, 208; 365/49

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,727,486 | 2/1988 | Smith et al. ............................. 711/208 |
| 4,807,115 | 2/1989 | Torng . |
| 4,858,105 | 8/1989 | Kuriyama et al. . |
| 4,888,688 | 12/1989 | Hartvigsen et al. .................... 711/207 |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,623,673 | 4/1997 | Gephardt et al. ........................ 395/733 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Messmer, Hans–Peter; The Indispensable PC Hardware Book, pp. 124–125, 1995.

Pentium Processor User's Manual, vol. 3: Architecture and Programming Manual, 1993, pp. 20–1 20–9.

Intel, "Chapter 2: Microprocessor Architecture Overview," pp. 2–1 through 2–4.

Michael Slater, "AMD's K5 Designed to Outrun Pentium,"—Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," Byte, Jan. 1996, 4 pages.

*Primary Examiner*—Ayaz R. Sheikh
*Assistant Examiner*—Rupal D. Dharia
*Attorney, Agent, or Firm*—Conley, Rose & Tayon, PC; B. Noel Kivlin

[57] ABSTRACT

A device and method that suspends segmentation addressing and prevents the modification of segmentation information (the segment registers and segment descriptors). By suspending segmentation addressing and preventing modification of segmentation information, the segmentation information does not have to be saved and restored by an interrupt. This reduces the overhead of the interrupt and allows the interrupt to be used in situations that are unfeasible for interrupts with larger overheads. When segmentation addressing is suspended, physical addresses are obtained from operands of the interrupt service routine instructions. Preventing the modification of the segmentation information allows operation of the processor to be transparently resumed after the completion of the interrupt.

15 Claims, 3 Drawing Sheets

SEGMENTATION SUSPEND MODE FOR REAL-TIME INTERRUPT SUPPORT

BACKGROUND OF THE INVENTION

1. Field of the Invention

This invention relates to microprocessor interrupts and, more particularly, to microprocessor interrupts that suspend segmentation addressing.

2. Description of the Relevent Art

The System Management Interrupt (SMI), was introduced as a mechanism to suspend execution and save the state of the processor to memory so it can be powered down. When the processor is powered on again, the state of the processor is restored and the processor transparently and instantly resumes execution. The SMI interrupt also causes the processor to switch to a different operating mode known as the System Management Mode (SMM). This allows special software, called the SMI handler, to be run. The SMI handler can preserve state information not handled automatically by the SMI (for example, floating point registers), or transfer the preserved state information to non-volatile memory, which allows the entire system to be powered down.

The SMM allows reasonably sophisticated software to be run. Therefore, an SMI can be used for a variety of functions where it is desirable to cause the processor to switch execution to another program that handles an external system event that is beyond the scope of the operating system. For example, an SMI can be used for power management of peripheral devices. When the software tries to access a peripheral that is not powered on, the system control logic generates an SMI to inhibit the instruction. The processor enters the SMM and executes code to cause the peripheral to be powered on. The SMI then restores the interrupted program which will complete the access. Another example is the emulation of peripherals. An SMI can be used to model peripherals in software or translate the protocol to model older interfaces with new peripherals.

In current x86 microprocessor systems, interrupts are fairly expensive due to overhead imposed by protection mechanisms and segmentation. The SMI interrupt is particularly expensive because it saves a large amount of processor state information. The latency of transferring the processor state information to memory and back again to resume the interrupted program typically costs tens of cycles. This large latency makes the SMI interrupt unfeasible for many time sensitive tasks. An improved interrupt mechanism would make a variety of new functions feasible that are currently unfeasible due to the overhead of saving and restoring the processor state of an SMI.

To reduce the overhead of an SMI interrupt, improved interrupt mechanisms allow the SMI handler to decide what state information needs to preserved. The SMI handler, however, does not have access to all state information. For example, the SMI handler does not have direct access to the segmentation descriptors, and therefore can not preserve them. Thus, the SMI interrupt mechanism must automatically preserve this information. What is desired is an interrupt mechanism that eliminates the need to preserve unnecessary state information such as segmentation information (the segment registers and their associated descriptors).

SUMMARY OF THE INVENTION

The problems outlined above are in large part solved by an improved interrupt mechanism that suspends segmentation addressing. By suspending segmentation addressing and inhibiting the modification of the segmentation registers and descriptors, the segmentation information does not have to be preserved during an interrupt. Reducing the amount of state information that needs to be preserved reduces the latency of the interrupt. Thus, the improved interrupt can be used in situations where conventional SMI interrupts are unfeasible due to high overhead.

In one embodiment, the processor switches to segment suspend mode by setting a Segment Suspend Flag (SSF). When the SSF is set, the processor's data translator disables segmentation addressing. Physical addresses are provided by instruction operands of the interrupt service routine. The effective base address is zero with a limit determined by the size of the instruction operand. Setting the SSF also prevents the modification of the segment registers.

The present invention contemplates a computer system including a processor core, an address translation unit coupled to the processor core via a local address bus, an address bus coupled to the address translation unit, and a control bus coupled to the processor core and the address translation unit. The processor is configured to disable segmentation addressing of the address translator when the processor executes a segmentation suspend interrupt.

The present invention further contemplates a segmentation addressing system includes a address translator which converts segment addresses to physical addresses, a segment register table, and a segment descriptor table. The conversion of segment addresses to physical addresses is suspended by a segmentation suspend interrupt, and modification of data in the segment register table and the segment descriptor table is prevented during said segmentation suspend interrupt.

The present invention further contemplates a method of storing state information of a processor including the steps of storing the state information indicated by a system management routine of a system management interrupt and disabling segmentation addressing of said processor.

BRIEF DESCRIPTION OF THE DRAWINGS

Other objects and advantages of the invention will become apparent upon reading the following detailed description and upon reference to the accompanying drawings in which.

Figure 1:
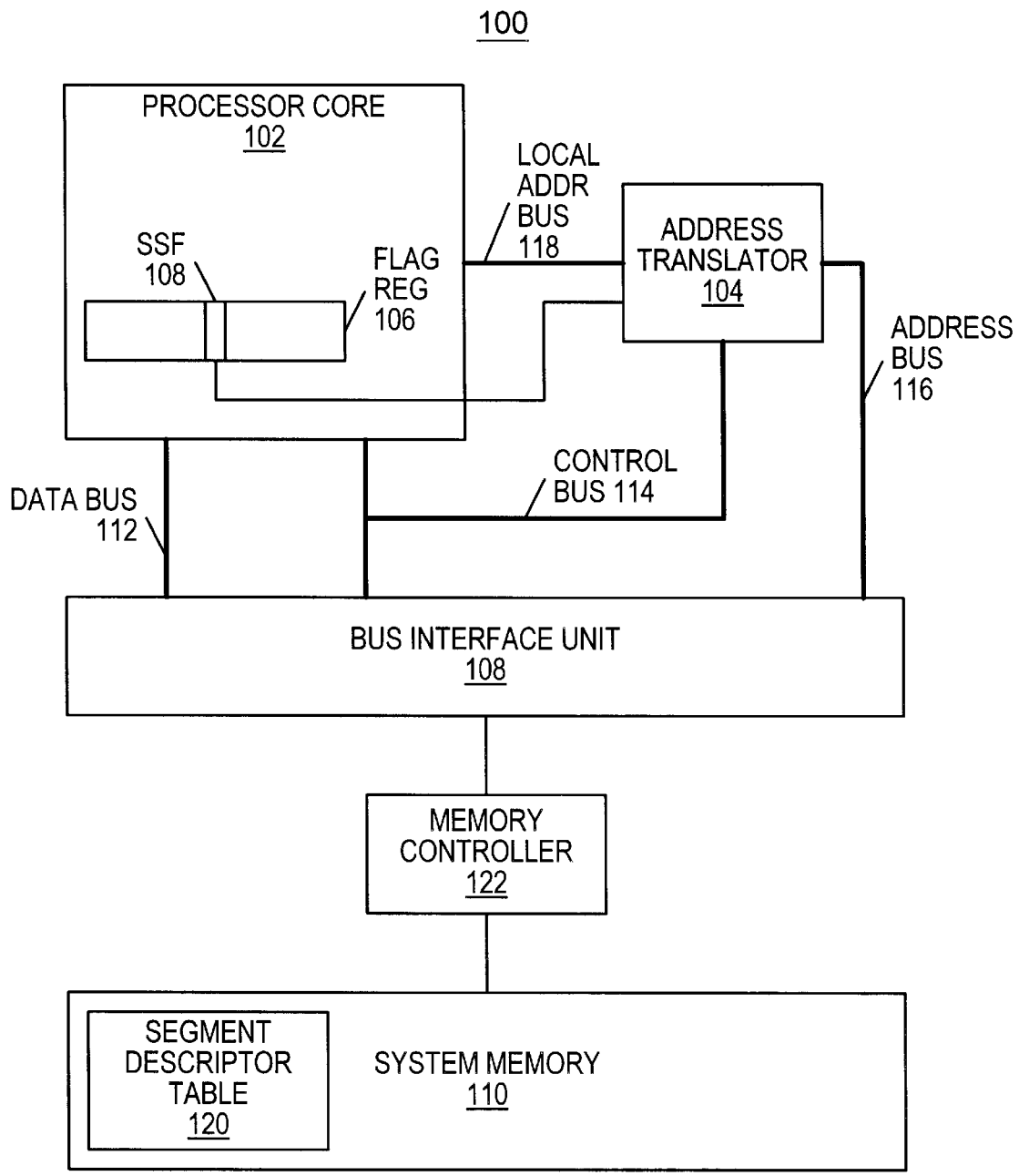
FIG. 1 is a block diagram of a computer system including segmentation suspend mode for interrupts.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system including segmentation suspend mode for interrupts. Computer system 100 includes a processor core 102, an address translator 104, a bus interface unit 108, a memory controller 122, a system memory 110, a control bus 114, a data bus 112, a local address bus 118, and an address bus 116. Processor core 102 includes a flag register 106 and a Segment Suspend Flag (SSF) 108. System memory 110 includes a segment descriptor table 120.

Processor core 102 implements a predetermined instruction set. Processor core 102 is illustrative of, for example, a model 80486 microprocessor core. System memory 110 is illustrative of a memory system comprised of, for example, dynamic RAM. It is apparent that other processors and other types of memory can be utilized.

Processor 102 transfers data to system memory 110 using data bus 112, control bus 114 and address bus 116. Address translator 104 receives addressing information over local address bus 118. Address translator 104 uses this addressing information to generate a physical memory address which is output on address bus 116. Data bus 114 transfers data signals, and control bus 118 transfers control signals necessary to complete the data transfer. Bus interface unit 108 orchestrates the transfer of data from processor 102 to memory controller 112. Memory controller 122 interfaces to system memory 110 and can prevent access to portions of system memory 110.

When processor 102 receives a segment suspend mode interrupt, processor 102 enters a mode of operation called a system management mode (SMM). Once in the SMM, processor 102 invokes an interrupt service routine. The interrupt service routine sets the SSF 118 of flag register 106. The SSF flag disables segmentation addressing of address translator 104, and prevents the modification of the segment registers. The interrupt service routine also communicates with memory control unit 122 to prevent access to segment descriptor table 120.

Upon completion of the interrupt service routine, SSF 118 of flag register 106 is cleared. This enables segmentation addressing of address translator 104, and allows the modification of the segment registers. The interrupt service routine also communicates with memory control unit 122 to disable access to segment descriptor table 120. The interrupt service routine restores the state information previously saved by the interrupt service routine and returns to its normal operating mode.

By suspending the segmentation addressing and preventing the modification of the segmentation registers and segmentation descriptor table 120, the need to save the state information of the segmentation information is eliminated. Because the segmentation information cannot be modified during the interrupt service routine, the state of the segmentation information will be unchanged when the processor resumes operation after a segmentation suspend mode interrupt.

While in the segment suspend mode, physical memory addresses are obtained from operands of the interrupt service routine instructions. The operands are used as physical addresses with an effective base address of zero. For example, if the default operand size for segment suspend mode instructions is 32 bits, the address range of the instructions is 0 to 4 GBytes. This eliminates the need to use segment registers to access system memory. It would be apparent that larger or smaller operand sizes can be used, and the addressable memory space will increase or decrease, respectively.

It is apparent that suspending segmentation addressing and preventing the modification of segmentation information can be accomplished through other methods than setting a flag bit. For example, an external register can be used to for the same purpose.

Figure 2:
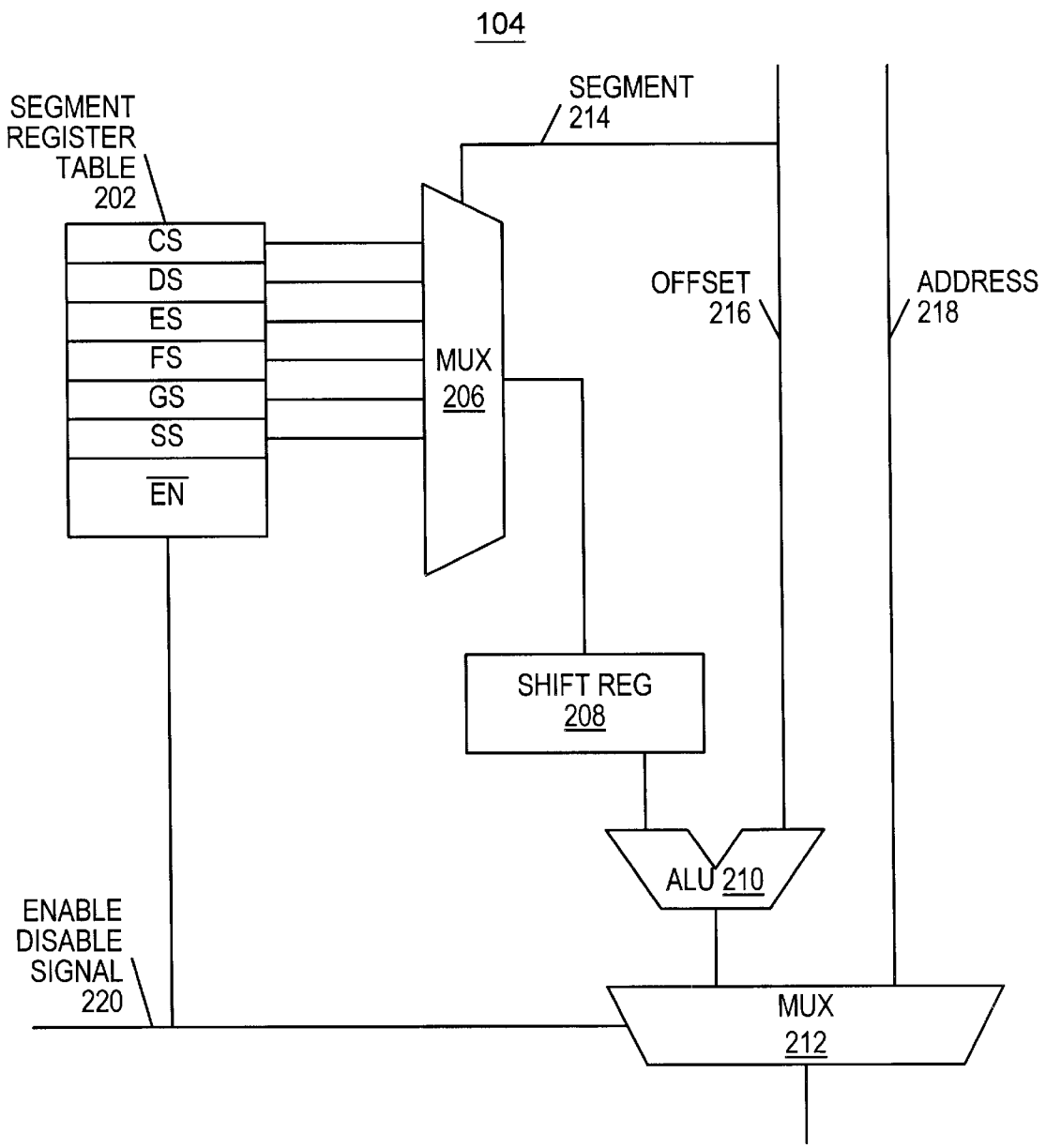
FIG. 2 is a block diagram of the address translation unit of FIG. 1.

Referring now to FIG. 2, address translator 104 generates a physical address from information on local address bus 118. Address translator 104 includes a segmentation address calculator, a multiplexer 212, a segment signal 214, an offset signal 216, an address signal 218, and an enable/disable signal 220. The segmentation address calculator includes a segment register table 202, a multiplexer 206, a shift register 208 and an arithmetic logic unit (ALU) 210 In a normal operating mode, address translation unit 104 uses segmentation addressing to generate a memory address. In segmentation addressing, a memory address is specified by an instruction using two parts: segment signal 214 and offset signal 216. Offset signal 216 indicates an offset within a selected segment. Segment signal 214 of local address bus 118 selects one of the segment registers of segment register table 202. The selected segment register indicates where the selected segment is located in memory (its base address) or points to a segment descriptor stored in segment descriptor table 120 in system memory 110. The segment descriptor contains information about the segment, including its base address. The base address is shifted by shift register 208 and added to offset signal 116 of local address bus 118 by ALU 210 to form the physical address.

In one embodiment, each instruction that has the ability to access memory has a default segment register from which it draws its segment data. For example, the x86 architecture defines six segment registers: CS, DS, SS, ES, FS, and GS. CS is the default segment register used for code (instruction) storage. DS is the default segment register used for instructions that do not manipulate stack values. For stack accesses, SS is the default segment register. ES is the default segment register used for string manipulation instructions. The default segment may be overridden in favor of another segment register for a particular instruction by adding a segment override prefix byte to the instruction. It is apparent that other segment register configurations and defaults can be used with the present invention.

In one embodiment, enable/disable signal 220 is coupled to SSF 118 of flag register 106. When SSF 118 is set multiplexer 212 selects address signal 218 rather than the segmentation address output from ALU 210. Address signal 218 is a physical address specified by an operand of an interrupt service routine instruction. Selecting address signal 218 effectively suspends segmentation addressing. SSF 118 is also coupled to segment register table 202. Setting SSF 118 disables segment register table 202, which prevents the data from being modified. This prevents the data within segment register 202 from being changed during the segment suspend mode interrupt. It is apparent that other ways of disabling segmentation addressing can be utilized, and other ways of preventing access to segment register table 202 and segment descriptor table 120 can be utilized.

Figure 3:
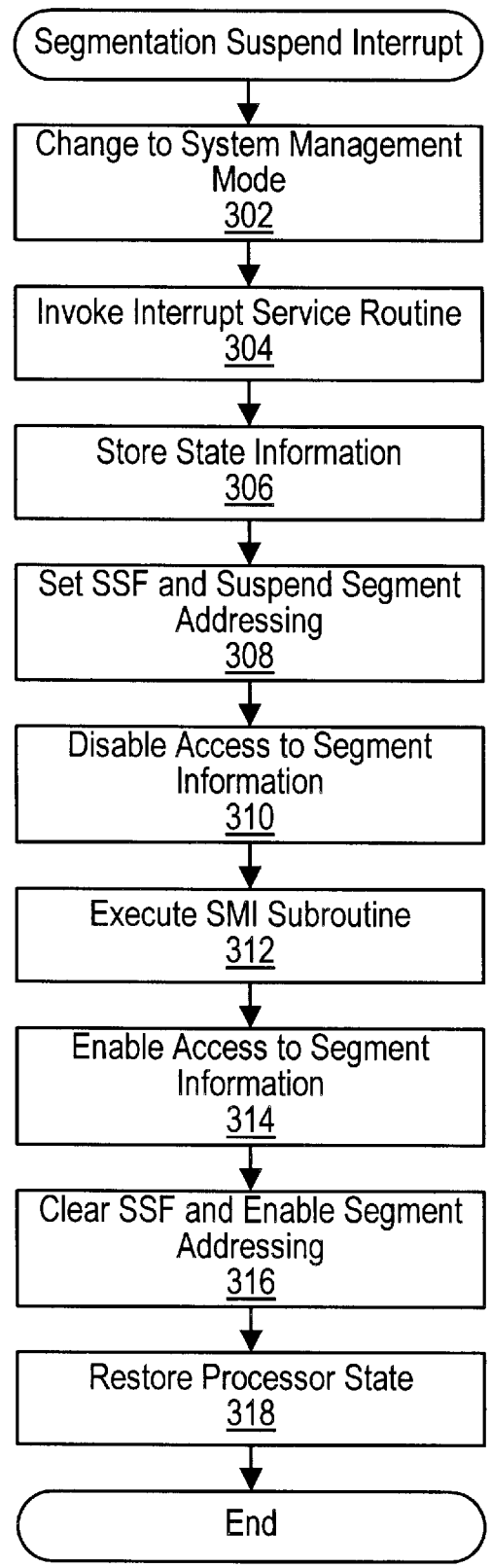
FIG. 3 is a flow diagram that illustrates the steps carried out by a microprocessor in response to a segmentation suspend mode real time interrupt.

FIG. 3 is a flow diagram that illustrates the steps carried out by a microprocessor in response to a segmentation mode suspend interrupt. When a microprocessor receives a segmentation suspend interrupt, in step 302, it changes to a system management mode (SMM) operating environment. In a step 304, the interrupt service routine is invoked. In a step 306, the interrupt service routine stores the state information needed to be preserved by that interrupt service routine. Any state information that will be changed during the execution of the interrupt service routine must be saved to permit transparent recovery. In a step 308, SSF flag 118 of flag register 106 is set and segmentation addressing is suspended. In a step 310, access to segment register table 202 and segment descriptor table 120 is disabled. In a step 312, the body of the interrupt service routine is executed. The body of the interrupt service routine performs the intended function of the interrupt service routine. For example, as discussed above, the body of the interrupt service routine may turn the power of a peripheral on or emulate the protocol of a peripheral.

After the body of the interrupt service routine is executed, the processor state is restored. In a step 314, access to segment register table 202 and segment descriptor table 120 is enabled. In a step 316, segmentation addressing is restored by clearing the SSF 118 of flag register 106. In a step 318, the state information stored in step 306 is restored.

Numerous variations and modifications will become apparent to those skilled in the art once the above disclosure is fully appreciated. It is intended that the following claims be interpreted to embrace all such variations and modifications.

What is claimed is:

1. A computer system comprising:
   a microprocessor including:
   a processor core;
   an address translator coupled to said processor core via a local address bus;
   an address bus coupled to said address translation unit; and
   a control bus coupled to said processor core and said address translation unit;
   wherein said address translator comprises:
   a segment register table;
   a segmentation address calculator; and
   a multiplexer with a first input coupled to said segmentation address calculator, a second input coupled to said local address bus, an output coupled to said address bus, and a selector input coupled to said processor core;
   wherein said microprocessor is configured to disable segmentation addressing of said address translator when said microprocessor executes a segmentation suspend interrupt;
   wherein a selector input signal is configured to indicate the occurrence of the segmentation suspend interrupt;
   wherein said microprocessor disables access to said segment register table when said segmentation suspend interrupt is executed.

2. The computer system as recited in claim 1 wherein said segmentation address calculator of said address translator comprises:
   a second multiplexer configured to select a register of said segment register table with dependence on an segment signal on said local address bus;
   a shift register coupled to an output of said second multiplexer; and
   an arithmetic logic unit coupled to said shift register and an offset signal on said local address bus.

3. The computer system as recited in claim 1 wherein said disabling of said segmentation addressing causes an address signal on said local address bus to be repeated on said address bus.

4. The computer system as recited in claim 3 further comprising:
   a data bus coupled to said processor core;
   a bus interface unit coupled to said address bus, said data bus and said control bus; and
   a memory system coupled to said bus interface unit;
   wherein said processor core stores state information in said memory system when said segmentation suspend interrupt is executed.

5. The computer system as recited in claim 4 further comprising a memory control unit coupled to said bus interface unit and said memory system, wherein said memory system includes a segment descriptor table and said memory control unit prevents access to said segment descriptor table during said segmentation suspend interrupt.

6. The computer system as recited in claim 1 wherein said processor core comprises a flag register including a segmentation suspend flag, wherein said segmentation suspend flag is set by said segmentation suspend interrupt and said setting of said segmentation suspend flag causes said disabling of segmentation addressing and said disabling of access to said segment register table.

7. A segmentation addressing system comprising:
   a address translator which converts segment addresses to physical addresses;
   a segment register table; and
   a segment descriptor table;
   wherein said conversion of segment addresses to physical addresses is suspended by a segmentation suspend interrupt, and modification of data in said segment register table and said segment descriptor table is prevented during said segmentation suspend interrupt;
   wherein said segment descriptor table is in a memory and a memory control unit prevents modification of data in said segment descriptor table during said segment suspend interrupt.

8. The segmentation addressing system recited in claim 7 further comprising:
   a flag register; and
   a segmentation suspend flag;
   wherein said segmentation suspend flag suspends said conversion of segment addresses and prevents said modification of said segment register table.

9. The segmentation addressing system recited in claim 7 wherein said address translation unit uses an operand of a segment suspend interrupt service routine instruction as a physical address when said conversion of segment addresses to physical addresses is suspended.

10. The segmentation addressing system recited in claim 7 wherein said address translator comprises:
    a segmentation address calculator; and
    a multiplexer with a first input coupled to said segmentation address calculator, a second input coupled to a local address bus, an output coupled to an address bus, and a selector input signal, which is configured to indicate the occurrence of a segmentation suspend interrupt.

11. The segmentation addressing system recited in claim 10 wherein said segmentation address calculator of said address translator comprises:
    a second multiplexer configured to select a register of said segment register table with dependence on a segment signal on said local address bus;
    a shift register coupled to an output of said second multiplexer; and
    an arithmetic logic unit coupled to said shift register and an offset signal on said local address bus.

12. A method of storing state information of a processor comprising:
    storing the state information indicated by a system management routine of a system management interrupt;

executing a segmentation suspend interrupt;

disabling access to segment registers in response to executing the segmentation suspend interrupt;

calculating a first address from information stored in one of the segment registers;

providing the first address to a first input of a multiplexer;

providing a second address to a second input of the multiplexer, and;

selecting the second address for output by the multiplexer in response to executing the segmentation suspend interrupt.

13. The method of storing state information of a processor as recited in claim 12 further comprising using said system management routine to disable access to segment descriptors.

14. The method of storing state information of a processor as recited in claim 12 wherein the second address is defined as a physical address.

15. The method of storing state information of a processor as recited in claim 13 further comprising:

executing an interrupt subroutine;

enabling access to segment registers and segment descriptors, and;

restoring the processor state from said stored processor state information.

* * * * *